United States Patent
Ostersetzer et al.

[11] Patent Number: 6,041,615
[45] Date of Patent: Mar. 28, 2000

[54] AIR CYCLE AIR CONDITIONING SYSTEM

[75] Inventors: Shlomo Ostersetzer, Ramat Gan; David Lior, Herzliya, both of Israel

[73] Assignee: Tat Technologies Ltd., Gedera, Israel

[21] Appl. No.: 09/123,304

[22] Filed: Jul. 28, 1998

[30] Foreign Application Priority Data

Jul. 28, 1997 [IL] Israel ........................................ 121418

[51] Int. Cl.[7] ................. F25D 9/00; F25B 9/00
[52] U.S. Cl. .................... 62/402; 62/87; 62/88
[58] Field of Search ............... 62/401, 402, 86, 62/87, 88

[56] References Cited

U.S. PATENT DOCUMENTS

| | | | |
|---|---|---|---|
| 4,015,438 | 4/1977 | Kinsell et al. | 62/88 |
| 4,198,830 | 4/1980 | Campbell | 62/87 |
| 4,295,518 | 10/1981 | Rannenberg | 165/2 |
| 4,420,950 | 12/1983 | Bodas et al. | 62/402 |
| 4,430,867 | 2/1984 | Warner | 62/402 |
| 5,373,707 | 12/1994 | Ostersetzer et al. | 62/401 |
| 5,461,882 | 10/1995 | Zywiak | 62/401 |
| 5,628,203 | 5/1997 | Adolph et al. | 62/402 |
| 5,911,388 | 6/1999 | Severson et al. | 244/118.5 |

*Primary Examiner*—William Doerrler
*Attorney, Agent, or Firm*—Ladas & Parry

[57] ABSTRACT

An air cycle air conditioning system including a turbine for receiving air and providing expansion thereof, thus lowering the temperature and pressure of the air, an air—air heat exchanger defining a first air flow path for air to be cooled and a second air flow path for air from the turbine at sub-atmospheric pressure to pass therethrough and absorb heat from the air to be cooled, and a compressor, at least partially driven by the turbine, for drawing air at sub-atmospheric pressure through the second flow path for air, characterized by a pre-heater which heats a flow of air, preferably comprising a mixer of ambient air and recirculation air, and directs this mixed flow to the air—air heat exchanger, thereby increasing its temperature and, as a result, the outlet temperature of the secondary air flow, thereby increasing its water vapor absorption capacity.

14 Claims, 3 Drawing Sheets

AIR CYCLE AIR CONDITIONING SYSTEM

FIELD OF THE INVENTION

The present invention relates to air cycle air conditioning systems and methods generally.

BACKGROUND OF THE INVENTION

The use of air cycle air conditioning systems as opposed to vapor cycle systems has become increasingly "environmentally correct" due to growing concern about the depletion of the earth's ozone layer due, inter alia, to release of fluorocarbons, which are used in vapor cycle systems.

One type of air cycle air conditioning system is described in U.S. Pat. No. 4,015,438 and employs inlet air at substantially ambient pressure which is cooled in a heat exchanger and introduced into an enclosure for cooling.

There is described and claimed in applicant's U.S. Pat. No. 5,373,707 a particularly efficient air cycle air conditioning system which employs water as a cooling medium. In this system subatmospheric air is employed as the cooling medium in the heat exchanger, thereby raising the water saturation point for a given temperature and thus the cooling capacity, thus attaining coefficient of performance (COP) values which are approximately twice those of systems which do not evaporate water as a cooling medium.

Although the air cycle air conditioning system of applicant's U.S. Pat. No. 5,373,707 is particularly efficient as compared with other prior art systems which do not employ water as a cooling medium, it is still limited in cooling capacity and COP by the amount of water which can be evaporated in a heat exchanger before the air reaches saturation.

SUMMARY OF THE INVENTION

The present invention seeks to provide an improved air cycle air conditioning system and method which is significantly more energy efficient than that described in applicant's U.S. Pat. No. 5,373,707 and other prior art systems.

There is thus provided in accordance with a preferred embodiment of the present invention an air cycle air conditioning system including a turbine for air and providing expansion thereof, thus lowering the temperature and pressure of the air, an air—air heat exchanger defining a first air flow path for air to be cooled and a second air flow path for air from the turbine at sub-atmospheric pressure to pass therethrough and absorb heat from the air to be cooled, and a compressor, at least partially driven by the turbine, for drawing air at sub-atmospheric pressure through the second flow path for air, characterized by a pre-heater which heats a flow of air, preferably comprising a mixture of ambient air and recirculation air, and directs this mixed flow to the air—air heat exchanger, thereby increasing its temperature and, as a result, the outlet temperature of the secondary air flow, thereby increasing its water vapor absorption capacity.

Additionally or alternatively, in accordance with an optional embodiment of the present invention, the mixed air in the primary flow may be replaced by water, thereby achieving similar performance and results.

In accordance with a preferred embodiment of the present invention, the pre-heater includes a pre-heater heat exchanger which receives exhaust air from the compressor, the exhaust air heating a flow of ambient air which flows through the pre-heater heat exchanger to the air—air heat exchanger.

Additionally or alternatively in accordance with a preferred embodiment of the present invention, the pre-heater includes an electrical resistance heater.

There is also provided in accordance with a preferred embodiment of the present invention, an air cycle air conditioning method including expanding air to a sub-atmospheric pressure, thereby lowering a temperature thereof, supplying the air at sub-atmospheric pressure to an air—air heat exchanger defining a first air flow path for air to be cooled and a second air flow path for the air at sub-atmospheric pressure to pass therethrough and absorb heat from the air to be cooled, and drawing air through the second flow path for air, characterized by pre-heating a flow of mixed air and direct the flow of mixed air to the air—air heat exchanger, thereby increasing the temperature and water vapor absorption capacity of the second air flow path.

In accordance with a preferred embodiment of the present invention, the step of pre-heating includes using a pre-heater heat exchanger which receives exhaust air drawn through a third flow path for air, the exhaust air heating a flow of mixed air which flows through the pre-heater heat exchanger to the air—air heat exchanger.

Additionally or alternatively in accordance with a preferred embodiment of the present invention, the step of pre-heating includes using an electrical resistance heater to perform the pre-heating.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
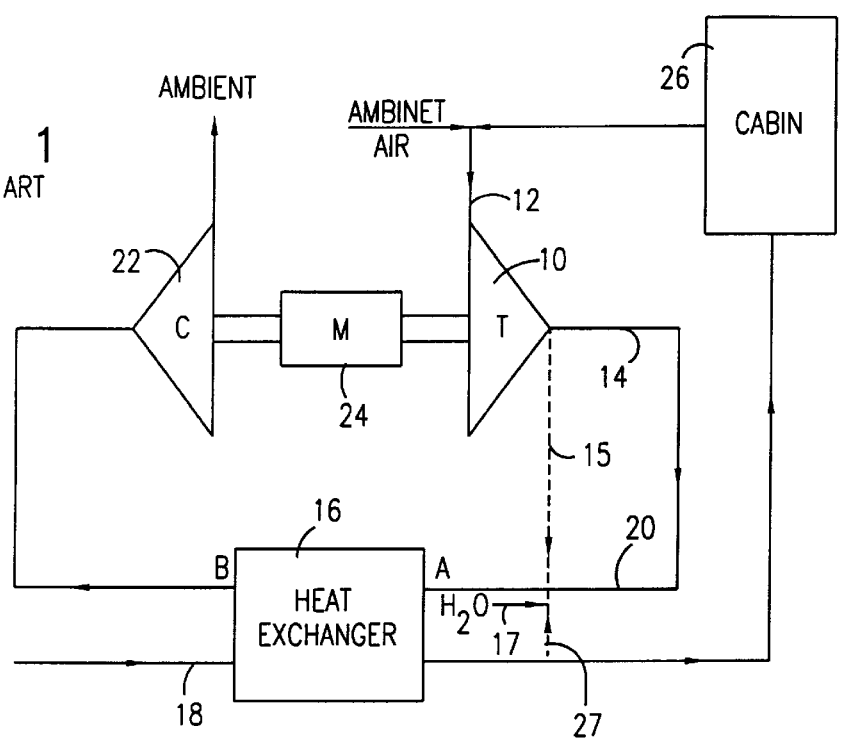
FIG. 1 is a simplified illustration of a prior art air cycle cooling system.

Reference is now made to FIG. 1 which illustrates a prior art air cycle cooling system, basically the same type of air cycle air conditioning system of applicant's U.S. Pat. Nos. 4,015,438 and 5,373,707, the disclosures of which are incorporated herein by reference.

A flow of ambient air is supplied to a turbine 10 at an inlet 12. Turbine 10 rotates, thereby expanding the inlet air. Such expansion lowers the temperature of the air supplied to turbine 10, lowers the pressure of the air to subatmospheric pressure, and condenses a portion of water vapor contained in the air.

The air at sub-atmospheric pressure exits turbine 10 at an exit 14 and is supplied to an air—air heat exchanger 16 defining a first air flow path 18 for air to be cooled and a second air flow path 20 for air to pass therethrough and absorb heat from the air to be cooled. Water may condense from the cold flow exiting at exit 14 and be passed to second air flow path 20, as shown at reference numeral 15. Water is typically additionally supplied from an external source 17 as well. The air from turbine 10 passes through second air flow path 20 into heat exchanger 16 at an inlet "A" and is heated, thus evaporating any liquid water present therein. The air is sucked from heat exchanger 16 via an exit "B" by the operation of a compressor 22, which is driven by turbine 10 and as needed, by an integral motor 24. In the prior art, compressor 22 exhausts the air sucked from the second air flow path 20 to the ambient.

Relatively warm or hot ambient air is introduced along the first flow path 18 of heat exchanger 16 for being cooled thereby and supplied to an enclosure 26, where it removes a heat load. Water may condense from the cold flow exiting heat exchanger 16 and be passed to second air flow path 20, as shown at reference numeral 27.

In the prior art sub-atmospheric air in the second air flow path 20 of heat exchanger 16, by virtue of its enhanced capacity for water evaporation, raises the cooling capacity, thereby attaining COP values twice those of systems which do not evaporate water as a cooling medium. However, the performance of such a prior art system is still low compared to that of vapor cycle air conditioning systems.

Figure 2:
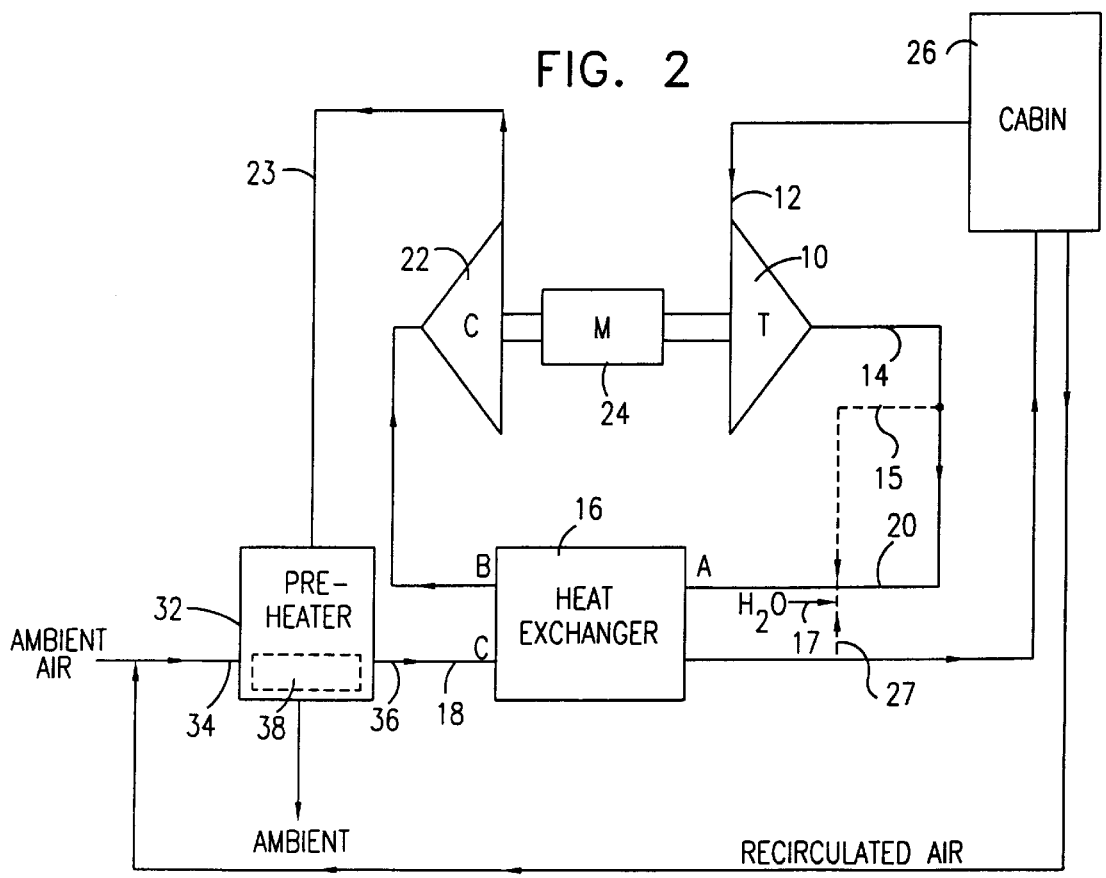
FIG. 2 is a simplified illustration of an air cycle cooling system constructed and operative in accordance with a preferred embodiment of the present invention.

Reference is now made to FIG. 2 which illustrates an air cycle cooling system 30, constructed and operative in accordance with a preferred embodiment of the present invention. For the sake of conciseness and clarity, only the differences between the present invention and the prior art illustrated in FIG. 1 will be described, the identical features being indicated in both figures by identical reference numerals. The system described herein may be applied to a variety of industrial, domestic and commercial applications.

In the present invention, the exhausted air from compressor 22 is not exhausted, as in the prior art, to ambient air, but is redirected in a third flow path 23 to a pre-heater heat exchanger 32 to heat incoming air which comprises ambient air, or more preferably, a mixture of ambient air and recirculating air, or alternatively water, from an inlet point 34 to an exit point 36. Alternatively, but less efficiently, this heating may be accomplished with an electrical resistance heater 38. Consequently, the temperature at point B ($T_B$), i.e., at the exit of second air flow path 20 of heat exchanger 16, becomes elevated, with the subsequent advantage that the water vapor absorption capacity of the air rises accordingly.

As in the prior art, water is preferably additionally supplied from external source 17. If necessary, a water softener may be used to soften the water to protect heat exchanger 16 against clogging due to sediments.

Nevertheless there are three negative effects due to the increase of $T_B$. Firstly, the power expended by compressor 22 also increases. This increase is proportional to $T_B$ in terms of absolute temperature and the increased humidity of the compressed air. Secondly, the temperature of the supply air to enclosure 26, i.e., at the exit of first air flow path 18 of heat exchanger 16, increases due to the increase of the temperature of the air exiting at point 36 and entering heat exchanger 16 at a reference point "C", the latter temperature being herein referred to as $T_C$. This increase diminishes the cooling capacity of the air cooling medium and COP. Thirdly, the outlet temperature of turbine 10 at exit 14 increases as well. This increase is due to the increased humidity in enclosure 26, which is the result of the increase of the air temperature at the exit of first air flow path 18 of heat exchanger 16. The increase in the outlet temperature of turbine 10 at exit 14 further increases the air temperature at the exit of first air flow path 18 of heat exchanger 16 until stabilization is reached.

All the above negative effects are more than balanced by the enhanced cooling capacity at the cold side of heat exchanger 16 (second air flow path 20) which leads to higher airflows at the hot side of the heat exchanger (first air flow path 18). Thus, the higher flows into enclosure 26 enhance the enclosure cooling capacity up to a point at which the increased temperature of the supply air to enclosure 26 outweighs the effect of the increased air flow. Therefore, there is an optimum $T_C$ which makes the COP of system 30.

Figure 3:
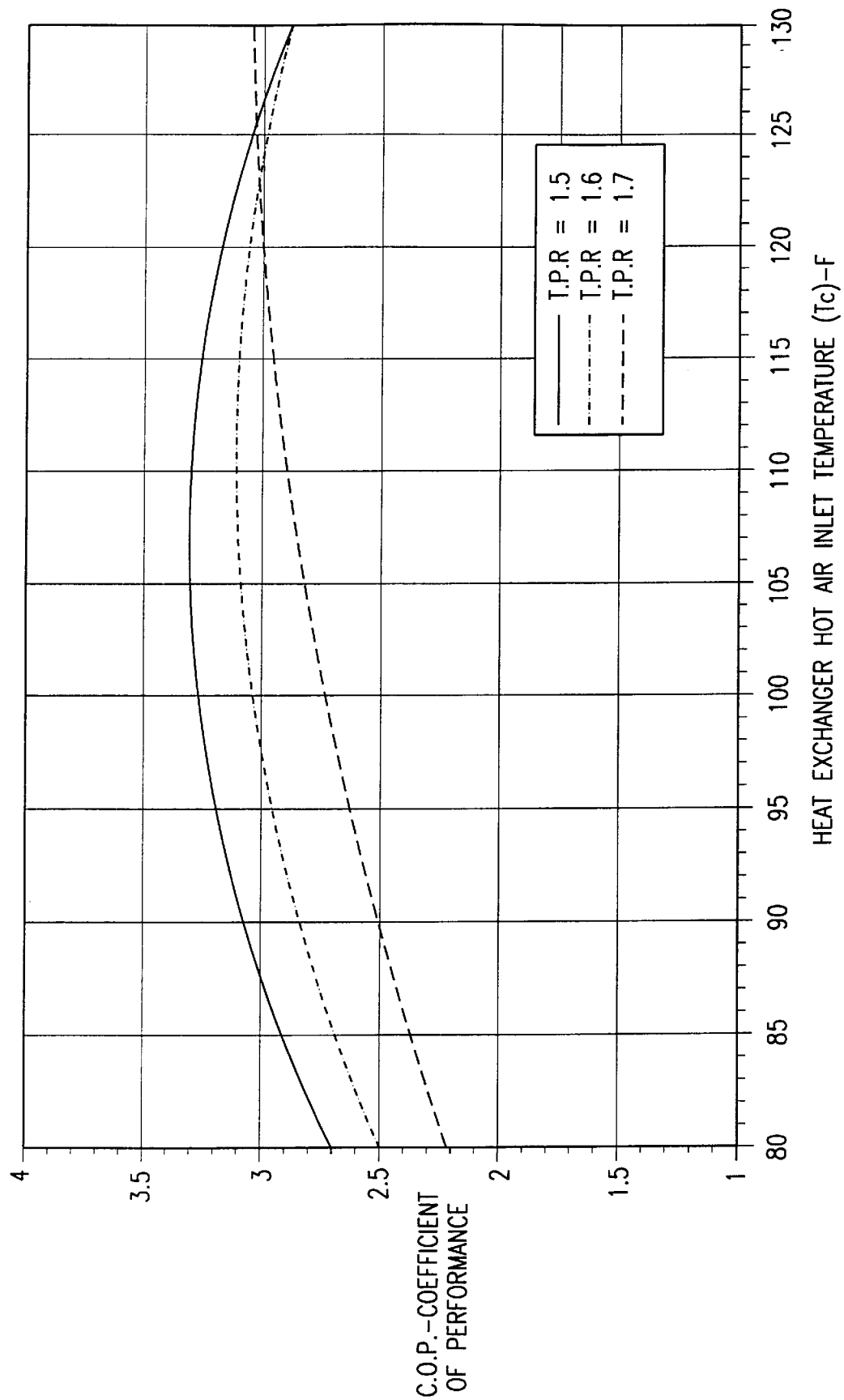
FIG. 3 is a typical graphical illustration of the effect of varying a temperature of air exiting a pre-heater heat exchanger and entering an air—air heat exchanger on the coefficient of performance for different turbine pressure ratios, in accordance with a preferred embodiment of the present invention.

Reference is now made to FIG. 3 which illustrates the typical effect of varying $T_C$ on the coefficient of performance for different turbine pressure ratios (1.5, 1.6 and 1.7), in accordance with a preferred embodiment of the present invention. To allow an objective comparison between the performance of this system and that of conventional vapor cycle systems, the COP in FIG. 3 is defined as follows:

$$COP = m_H Q_{useful}/P_E,$$

where $m_H$ is the mass flow of the hot air stream (first air flow path 18).

$Q_{useful}$ is the heat extracted per unit mass flow of the hot air stream as measured between a point upstream of the preheater 32 and a point downstream of the heat exchanger 16 (FIG. 2). In terms of useful cooling power, $m_H Q_{useful}$ is equivalent to the sum of enclosure and fresh air heat loads.

$P_E$ is the overall electrical input power (with due consideration to electrical and mechanical losses).

Figure 4:
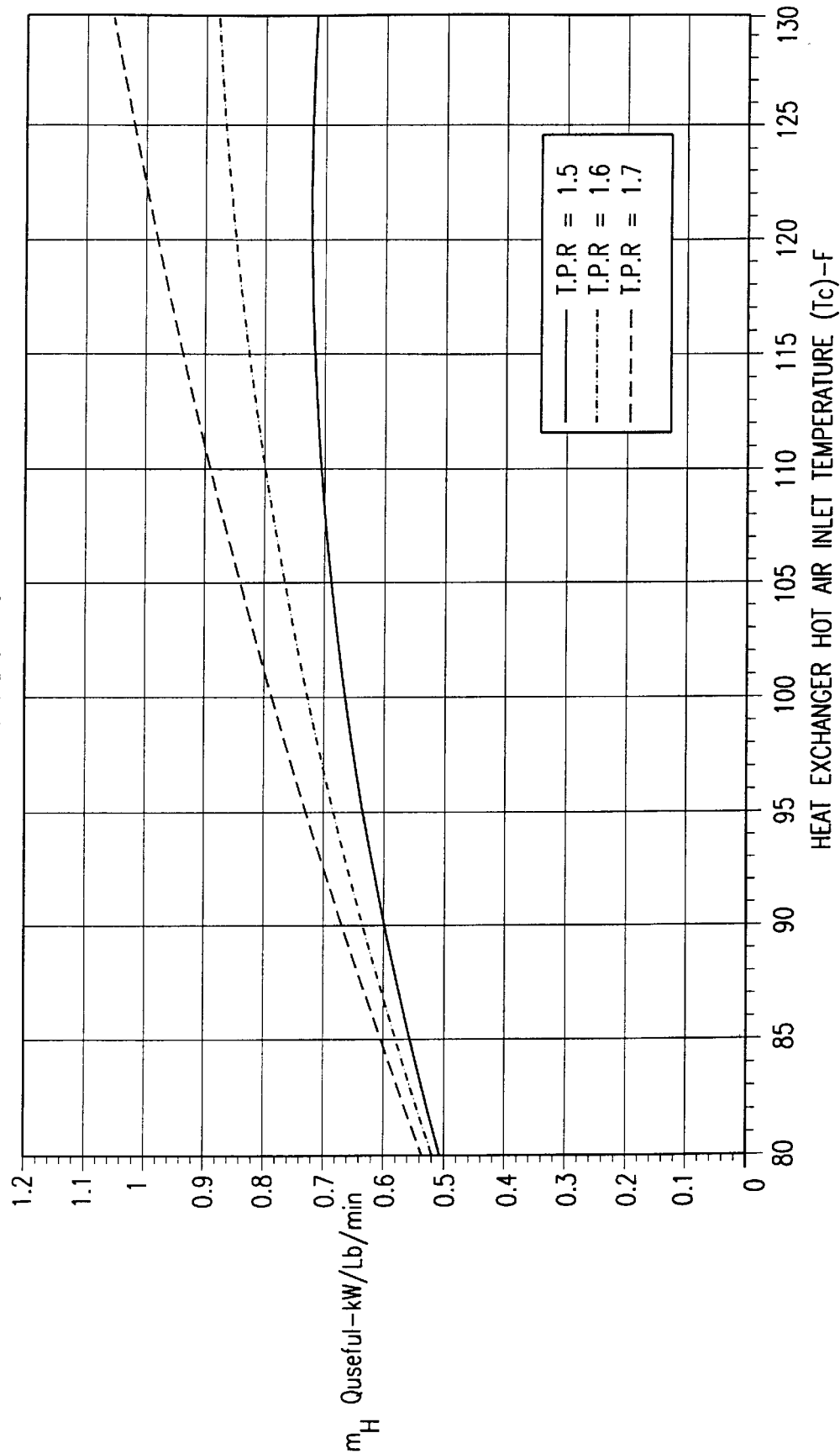
FIG. 4 is a typical graphical illustration of the effect of a temperature of air exiting a pre-heater heat exchanger and entering an air—air heat exchanger on the cooling capacity for different turbine pressure ratios, in accordance with a preferred embodiment of the present invention.

Reference is also made to FIG. 4 which illustrates the typical effect of varying $T_C$ on the cooling capacity for different turbine pressure ratios (1.5, 1.6 and 1.7), in accordance with a preferred embodiment of the present invention.

The enhancement of $Q_{useful}$ in accordance with a preferred embodiment of the present invention is a novel method for increasing the cooling capacity under extreme hot/humid conditions. By comparing FIGS. 3 and 4, it can be seen, for example, that it is advantageous to design for maximum efficiency at a low turbine pressure ratio for normal operating conditions and to use the option of a sizable increase in cooling capacity by increasing the pressure ratio for emergency cooling. This can be readily achieved by the use of a variable speed drive. It should be noted that in the increased cooling mode, the reduction in efficiency is not at all prohibitive and this indicates that a multitude of design trade-offs may be considered.

It will be appreciated by persons skilled in the art that the present invention is not limited by what has been particularly shown and described hereinabove. Rather the scope of the present invention is defined only by the claims which follow:

What is claimed is:

1. An air cycle air conditioning system comprising:

a turbine for receiving air and providing expansion thereof, thus lowering a temperature thereof;

an air—air heat exchanger defining a first air flow path for a fluid to be cooled and a second air flow path for air from said turbine at sub-atmospheric pressure to pass therethrough and absorb heat from the fluid to be cooled; and a compressor, at least partially driven by said turbine, for drawing air at sub-atmospheric pressure through the second flow path for air, characterized by a pre-heater which heats a flow of incoming air, said incoming air not coming from said turbine, and directs said flow of incoming air via said first air flow path to said air—air heat exchanger, thereby heating said incoming air and consequently increasing a temperature and water vapor absorption capacity of said air of said second airflow path.

2. A system according to claim 1 wherein said incoming air comprises at least one of ambient air, recirculating air, and water.

3. A system according to claim 1 wherein said pre-heater comprises a pre-heater heat exchanger which receives exhaust air from said compressor, said exhaust air heating said flow of incoming air which flows through said pre-heater heat exchanger to said air—air heat exchanger.

4. A system according to claim 2 wherein said pre-heater comprises a pre-heater heat exchanger which receives exhaust air from said compressor, said exhaust air heating said flow of incoming air which flows through said pre-heater heat exchanger to said air—air heat exchanger.

5. A system according to claim 1 wherein said pre-heater comprises an electrical resistance heater.

6. A system according to claim 2 wherein said pre-heater comprises an electrical resistance heater.

7. A system according to claim 3 wherein said pre-heater comprises an electrical resistance heater.

8. A system according to claim 4 wherein said pre-heater comprises an electrical resistance heater.

9. An a cycle air conditioning method comprising:

expanding air to a sub-atmospheric pressure, thereby lowering a temperature thereof;

supplying the air at sub-atmospheric pressure to an air—air heat exchanger defining a first air flow path for a fluid to be cooled and a second air flow path for the air at sub-atmospheric pressure to pass therethrough and absorb heat from the fluid to be cooled; and drawing air through the second flow path for air, characterized by pre-heating a flow of incoming air, said incoming air not coming from said turbine, and directing said flow of incoming air via said first air flow path to said air—air heat exchanger, thereby heating said incoming air and consequently increasing a temperature and water vapor absorption capacity of said air of said second air flow path.

10. A method according to claim 9 wherein said incoming air comprises at least one of ambient air, recirculating air, and water.

11. A method according to claim 9 wherein said step of pre-heating comprises using hot exhaust air to perform said pre-heating.

12. A method according to claim 10 wherein said step of pre-heating comprises using hot exhaust air to perform said pre-heating.

13. A method according to claim 9 wherein said step of pre-heating comprises using an electrical resistance heater to perform said pre-heating.

14. A method according to claim 10 wherein said step of pre-heating comprises using an electrical resistance heater to perform said pre-heating.

* * * * *